United States Patent
Kang et al.

(10) Patent No.: US 10,425,740 B2
(45) Date of Patent: Sep. 24, 2019

(54) VIBRATION OUTPUT APPARATUS AND PORTABLE ELECTRONIC DEVICE COMPRISING VIBRATION OUTPUT APPARATUS

(71) Applicant: YEIL ELECTRONICS CO., LTD., Incheon (KR)

(72) Inventors: Yoon Kyu Kang, Gyeonggi-do (KR); Jae Yong Kim, Busan (KR)

(73) Assignee: Yeil Electronics Co., Ltd., Incheon (KR)

( * ) Notice: Subject to any disclaimer, the term of this patent is extended or adjusted under 35 U.S.C. 154(b) by 0 days.

(21) Appl. No.: 15/549,650

(22) PCT Filed: Nov. 17, 2015

(86) PCT No.: PCT/KR2015/012335
§ 371 (c)(1),
(2) Date: Aug. 8, 2017

(87) PCT Pub. No.: WO2016/182155
PCT Pub. Date: Nov. 17, 2016

(65) Prior Publication Data
US 2018/0048747 A1    Feb. 15, 2018

(30) Foreign Application Priority Data

May 8, 2015   (KR) .......... 10-2015-0064743
Sep. 8, 2015  (KR) .......... 10-2015-0127251

(51) Int. Cl.
*H04R 9/02*   (2006.01)
*H04R 1/02*   (2006.01)
(Continued)

(52) U.S. Cl.
CPC .......... *H04R 9/025* (2013.01); *G02B 27/017* (2013.01); *H04M 1/03* (2013.01); *H04R 1/028* (2013.01);
(Continued)

(58) Field of Classification Search
CPC . H04R 9/02; H04R 9/025; H04R 9/06; H04R 1/028; H04R 1/1091; H04R 25/604;
(Continued)

(56) References Cited

U.S. PATENT DOCUMENTS

2006/0233415 A1* 10/2006 Chung .................. B06B 1/045
                                                    381/396
2009/0243404 A1* 10/2009 Kim ..................... H02K 33/16
                                                     310/25
2010/0150389 A1*  6/2010 Sumiyama ............... H04R 1/22
                                                    381/386

FOREIGN PATENT DOCUMENTS

CN         1675846 A    9/2005
CN       101203067 A    6/2008
(Continued)

OTHER PUBLICATIONS

International Search Report for PCT/KR2015/012335 dated Feb. 26, 2016, 4 pgs.

*Primary Examiner* — Yogeshkumar Patel
(74) *Attorney, Agent, or Firm* — Martin & Ferraro, LLP (57) ABSTRACT

The present invention relates to an apparatus for outputting vibration, and an exemplary embodiment of the present invention may provide an apparatus for outputting vibration, the apparatus including: a magnetic circuit which generates vibration; a yoke which is in contact with an upper surface of the magnetic circuit and has a raised spot with different heights in a height direction in at least one of the lateral surfaces of the yoke such that one or more spaces are formed in an upper surface of the yoke; and an elastic body which
(Continued)

is in contact with at least a part of the upper surface of the yoke, and vibratorily moves in the one or more spaces, in which the elastic body is formed of a first elastic unit and a second elastic unit, and the first elastic unit and the second elastic unit are integrally molded.

11 Claims, 10 Drawing Sheets

(51) Int. Cl.

| | | |
|---|---|---|
| *H04R 9/06* | (2006.01) | |
| *G02B 27/01* | (2006.01) | |
| *H04M 1/03* | (2006.01) | |
| *H04R 1/10* | (2006.01) | |
| *H04R 25/00* | (2006.01) | |
| *H04R 29/00* | (2006.01) | |
| *H04M 1/05* | (2006.01) | |

(52) U.S. Cl.
CPC ............ *H04R 1/1091* (2013.01); *H04R 9/02* (2013.01); *H04R 9/06* (2013.01); *H04R 25/604* (2013.01); *H04R 29/001* (2013.01); *G02B 2027/014* (2013.01); *G02B 2027/0134* (2013.01); *G02B 2027/0178* (2013.01); *G02B 2027/0187* (2013.01); *H04M 1/05* (2013.01); *H04R 2201/02* (2013.01); *H04R 2400/11* (2013.01); *H04R 2460/13* (2013.01); *H04R 2499/11* (2013.01); *H04R 2499/15* (2013.01)

(58) Field of Classification Search
CPC .............. H04R 29/001; H04R 2460/13; H04R 2499/11; H04R 2400/11; H04R 2201/02; H04R 2499/15; H04M 1/03; H04M 1/05; G02B 27/017; G02B 2027/0134; G02B 2027/014; G02B 2027/0178; G02B 2027/0187; B06B 1/045
See application file for complete search history.

(56) References Cited

FOREIGN PATENT DOCUMENTS

| | | |
|---|---|---|
| CN | 102244453 A | 11/2011 |
| KR | 1019990046111 A | 6/1999 |
| KR | 1003609 | 10/2009 |

* cited by examiner

VIBRATION OUTPUT APPARATUS AND PORTABLE ELECTRONIC DEVICE COMPRISING VIBRATION OUTPUT APPARATUS

This is a National Phase Application under 35 USC 371 of PCT/KR2015/012335 filed Nov. 17, 2015 (published on Nov. 17, 2016 as WO 2016/182155); which claims priority to Korean Application Nos. 10-2015-0064743 filed May 8, 2016 and 10-2015-0127251 filed Aug. 8, 2015; all of which are incorporated by reference herein in their entirety.

TECHNICAL FIELD

The present invention relates to an apparatus for outputting vibration, and more particularly, to an apparatus for outputting vibration by using a bone conduction technology, and a portable electronic device including the apparatus for outputting vibration.

BACKGROUND ART

Recently, products using a bone conduction technology, which is mounted in a mobile phone to be widely known, have emerged in succession. Various electronic devices, for example, an application product including a speaker or a hearing aid, using the bone conduction technology, have been commercialized. Temuco Japan, which holds the patent related to the bone conduction plans to release a product, such as a speaker and a microphone, which is usable even in a vacuum state and without regard to a usage place, such as underwater, and adopts the bone conduction technology.

In general, vibration of air beats eardrums and the vibration is transferred to cochlea, so that a sound is recognized. On the contrary, the bone conduction directly transmits vibration from a bone to the cochlea. Such a principle enables a user to hear the sound even though the user covers the ears. Accordingly, even though the eardrum has a problem, when the cochlea and the auditory nerve are normal, a person may hear the sound through the bone conduction.

The bone conduction technology itself has been established before, but it is difficult to miniaturize a product adopting the bone conduction technology for commercialization. The reason is that an output by the bone conduction is in proportion to a size of the product. Accordingly, Temuco Japan has invested greatly in developing a bone conduction speaker, in which the number of components is decreased and of which an internal structure is changed. Further, Temuco Japan also has conducted a research on a bone conduction speaker for voice communication, which applies the bone conduction technology.

In general, a sound or vibration output apparatus is an apparatus, such as a speaker, a receiver, a buzzer, a vibration motor (vibrator), outputting a sound or vibration force, which converts an electrical signal input from a signal source into a mechanical signal to output a sound or generate vibration force, and a bone conduction output apparatus also corresponds thereto.

The sound or vibration output apparatus is applied to considerably various fields according to a size and a usage. Particularly, in response to the growth of the information and communication industry, as a small sound or vibration output apparatus, particularly, a small vibration motor, which is widely used for a vibration call of a communication terminal, an application of a linear motion vibration motor, which has a function exceeding a function of an existing rotary vibration motor, is sharply increased according to popularity of a touch screen terminal including a smart phone.

The reason why the linear motion vibration motor is widely applied to a portable IT device, such as a touch phone including a smart phone and a general mobile phone, is a high response speed, small noise, and a greatly improved product life, compared to those of the rotary vibration motor. The response speed means a time taken until vibration force reaches 50% of vibration force in a maximum displacement, which is the biggest reason for the adoption of the linear motion vibration motor.

Recently, a touch screen terminal is evolved to a smart phone and is used by downloading various applications, and the applications perform various functions and demand feedback vibrations in accordance with the functions, and in order to satisfy the demand, there is a demand for a vibration motor having a higher response speed, that is, a higher reaction speed, than that of the linear motion vibration motor in the related art, in the technical field.

DISCLOSURE

Technical Problem

The present invention is conceived to solve the above mentioned problem, and an object of the present invention is to provide a vibration output apparatus, which increases exciting force of an elastic body and is capable of directly transmitting vibration to the body and skin.

The present invention is also conceived to solve the above mentioned problem, and an object of the present invention is to provide a vibration output apparatus, which is capable of increasing a bone conduction rate by transmitting vibration without loss.

Technical Solution

An exemplary embodiment of the present invention provides an apparatus for outputting vibration, the apparatus including: a magnetic circuit which generates vibration; a yoke which is in contact with an upper surface of the magnetic circuit and has a raised spot with different heights in a height direction in at least one of lateral surfaces of the yoke such that one or more spaces are formed in an upper surface of the yoke; and an elastic body which is in contact with at least a part of the upper surface of the yoke, and vibratorily moves in the one or more spaces, in which the elastic body is formed of a first elastic unit and a second elastic unit, and the first elastic unit and the second elastic unit are integrally molded.

Advantageous Effects

The apparatus for outputting vibration according to still another exemplary embodiment of the present invention may prevent a bone conduction rate from being decreased and prevent a distortion phenomenon due to vibration reduction by directly transmitting vibration to the body and skin.

The effects of the present invention are not limited to the mentioned effects, and the other non-mentioned effects may be clearly understood by those skilled in the art on the basis of the description below.

DESCRIPTION OF DRAWINGS

Various aspects are described with reference to the drawings, and herein, like reference numerals are generally used to designate like constituent elements. In the exemplary embodiments below, for the purpose of description, a plurality of specific and detailed matters are suggested in order to provide general understanding of one or more aspects. In other examples, publicly-known structures and devices are illustrated in a form of a block diagram for easy description of one or more aspects. In other examples, publicly-known structures and devices are illustrated in a form of a block diagram for easy description of one or more aspects.

BEST MODE

The aforementioned objects, features, and advantages of the present invention will be clearer through the following detailed description associated with the accompanying drawings. A specific structure and functional descriptions below are simply exemplified for the purpose of describing exemplary embodiments according to a concept of the present invention, and the exemplary embodiments according to the concept of the present invention may be implemented in various forms, and it shall not be interpreted that the exemplary embodiments according to the concept of the present invention are not limited to the exemplary embodiments described in the present specification or application.

The exemplary embodiment according to the concept of the present invention may be variously modified and have various forms, so that specific exemplary embodiments will be illustrated in the drawings and described in detail in the present specification or application. However it should be understood that exemplary embodiments according to the concept of the present invention are not limited to a specific disclosure form, and include all changes, equivalents, or alternatives which are included in the spirit and technical scope of the present invention.

Terms "first", "second", and the like may be used for describing various constituent elements, but the constituent elements should not be limited to the terms. Only for the purpose of discriminating one constituent element from another constituent element, for example, without departing from the scope according to the concept of the present disclosure, a first constituent element may be named as a second constituent element, and similarly a second constituent element may be named as a first constituent element.

It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" "directly connected to" or "being in contact with" another constituent element, it should be understood that there is no intervening element present. Other expressions for explaining relationships among constituent elements, that is, "between . . . " and "just between . . . " or "adjacent to . . . " and "directly adjacent to . . . ", shall be interpreted in a similar manner.

Terms used in the present specification are used only to describe specific exemplary embodiments, and are not intended to limit the present invention. As used herein, the singular forms are intended to include the plural forms as well, unless the context clearly indicates otherwise. In this specification, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

All terms used herein including technical or scientific terms have the same meanings as meanings which are generally understood by those skilled in the art unless they are differently defined. Terms which are defined in a generally used dictionary should be interpreted to have the same meaning as the meaning in the context of the related art, but are not interpreted as an ideally or excessively formal meaning if it is not clearly defined in this specification.

Hereinafter, exemplary embodiments of the present invention will be described in detail with reference to the accompanying drawings.

Figure 1:
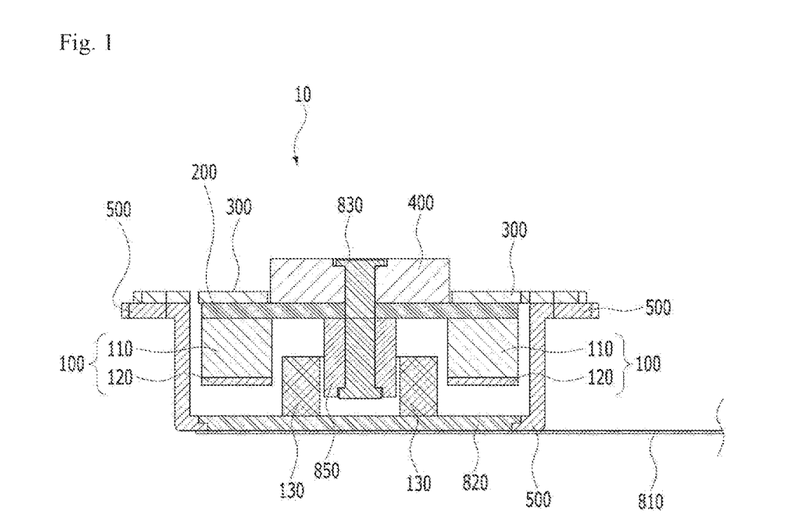
FIG. 1 is a cross-sectional view illustrating a cross-section of a vibration output apparatus according to an exemplary embodiment of the present invention.

FIG. 1 is a cross-sectional view illustrating a cross-section of a vibration output apparatus according to an exemplary embodiment of the present invention.

Referring to FIG. 1, a vibration output apparatus 10 according to the embodiment of the present invention may include a magnetic circuit 100, a yoke 200, and an elastic body 300.

The magnetic circuit 100 may generate vibration. The magnetic circuit 100 may include a magnet 110 and a top plate 120. Herein, the magnet 110 may be formed of a material having magnetic force, and may vibrate according to a change in a peripheral magnetic field. Further, the top plate 120 may concentrate the magnetic force of the magnet 110. The magnetic circuit 100 may be provided at a predetermined interval with a coil 130. When an alternating current signal is applied to the coil 130, the magnet 110 may vibrate according to a direction, intensity, and a size of frequency of the alternating current signal applied to the coil 130. That is, the magnet 110 may serve as a vibrator vibrating according to the alternating current signal applied to the coil 130. This results from Fleming's left hand law, in which a conductor positioned within a magnetic field receives force in a predetermined direction, and a theory related to the principle is the publicly known technology, so that a detailed description thereof will be omitted. In the related art, a vibration motor using a brush and a commutator is frequently used, but has a problem in excessive noise and miniaturization, so that the vibration output apparatus 10 according to the exemplary embodiment of the present invention may include the coil 130 and the magnetic circuit 100 for generating vibration. The vibration generated by the magnetic circuit 100 may be directly transmitted to the yoke 200 which is in contact with an upper surface of the magnetic circuit 100.

The yoke 200 may be provided to be in contact with the upper surface of the magnetic circuit 100. Herein, the contact of the yoke 200 to the magnetic circuit 100 means that a separate vibration transmitting body is not provided between the yoke 200 and the magnetic circuit 100 and the yoke 200 and the magnetic circuit 100 are provided so that the vibration generated by the magnetic circuit 100 is directly transmitted to the yoke 200. That is, the vibration generated by the magnetic circuit 100 may be directly transmitted to the yoke 200 by sequentially stacking the yoke 200 on the upper surface of the magnetic circuit 100 or integrally manufacturing the magnetic circuit 100 and the yoke 200 at the time of the manufacturing.

In this case, the yoke 200 may be provided with a predetermined space 210 so as to enable the elastic body 300 to vibrate. To describe in more detail, the yoke 200 according to the exemplary embodiment of the present invention may be generally implemented in a rectangular parallelepiped shape, and may have a structure, in which one side surface in the rectangular parallelepiped shape of the yoke 200 is formed with a raised spot 220 with different heights in a height direction, so that one or more spaces 210 are formed on an upper surface of the yoke 200.

The elastic body 300 may include a plurality of elastic units. For example, the elastic body 300 may include a first elastic unit 310 and a second elastic unit 320. Further, the elastic body 300 may include one or more unit connecting parts for connecting the elastic units 310 and 320.

The plurality of elastic units and the one or more unit connecting parts, which are included in the elastic body 300 may be integrally molded. For example, the first elastic unit 310, the second elastic unit 320, and the plurality of unit connecting parts 330 and 340, which are included in the elastic body 300, may be integrally molded by an insert injection molding method using a synthetic resin or a natural resin.

Further, the first elastic unit 310, the second elastic unit 320, and the plurality of unit connecting parts 330 and 340, which are included in the elastic body 300, may be integrally molded by a casting method using a metal member.

The foregoing example is simply the exemplary embodiment, and the elastic body 300 is not limited thereto, and the second elastic unit 320, and the plurality of unit connecting parts 330 and 340 may be integrally molded by using an elastic member.

Figure 2A:
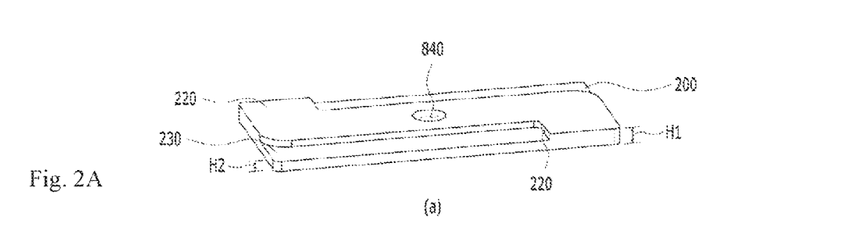
FIG. 2A is a perspective view illustrating the yoke according to the exemplary embodiment of the present invention.
Figure 2B:
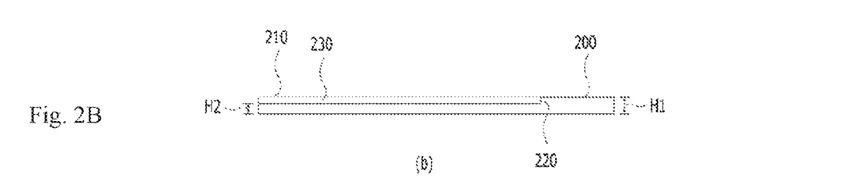
FIGS. 2B and 2C are diagrams illustrating the yoke according to the exemplary embodiment of the present invention viewed from one side.
Figure 2C:
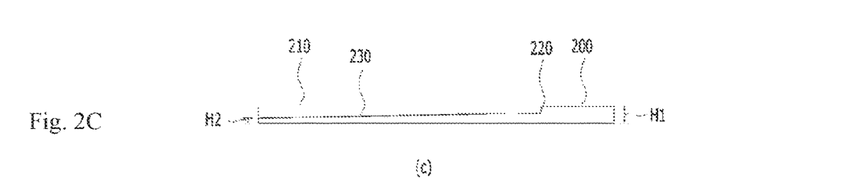
Figure 2D:
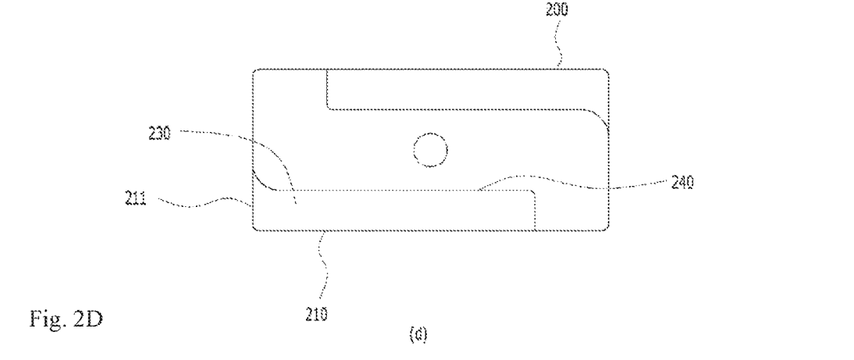
FIG. 2D is a diagram illustrating the yoke according to the exemplary embodiment of the present invention viewed from a top side.

FIG. 2A is a perspective view illustrating the yoke according to the exemplary embodiment of the present invention, FIGS. 2B and 2C are diagrams illustrating the yoke according to the exemplary embodiment of the present invention viewed from one side, FIG. 2D is a diagram illustrating the yoke according to the exemplary embodiment of the present invention viewed from a top side.

Referring to FIG. 2A, the magnetic circuit 100 may be in contact with a lower surface of the yoke 200 according to the exemplary embodiment of the present invention. Further, a vibration plate 400 and the elastic body 300 may be in contact with the upper surface of the yoke 200 according to the exemplary embodiment of the present invention. Furthermore, the predetermined space 210 may be formed in the upper surface of the yoke 200 according to the exemplary embodiment of the present invention so that the elastic body 300 may vibrate. Herein, the number of predetermined spaces 210 may be two or more. In the exemplary embodiment, when the elastic body 300 including the two elastic units 310 and 320 is used, two or more spaces 210 may be formed so that the two elastic units 310 and 320 may vibrate. The space 210, in which the elastic body 300 according to the exemplary embodiment of the present invention may vibrate, may be formed by performing a cutting process on the upper surface of the yoke 200. For example, when the yoke 200 according to the exemplary embodiment of the present invention has the rectangular parallelepiped shape, the predetermined space 210 may be formed by cutting a part of the upper surface of the rectangular parallelepiped shaped yoke 200. By the predetermined space 210 formed in the upper surface of the yoke 200, the yoke 200 may be formed with different heights when viewed from one side. This will be described in detail below.

Referring to FIG. 2B, when a part of the upper surface of the yoke 200 is cutting processed in a rectangular parallelepiped shape and the yoke 200 is viewed from one side, different heights H1 and H2 may be observed. Further, the yoke 200 according to the exemplary embodiment of the present invention may be provided with the raised spot 220 formed by a difference between the heights H1 and H2 at a portion, in which the yoke 200 provided with the height H1 meets the yoke 200 provided with the height H2. Here, a portion, in which the raised spot 220 is formed, may be variously set according to a setting of a user, and the scope of the present invention is not limited to a special position, in which the raised spot 220 is formed. In FIG. 2B, the heights of the yoke 200 according to the exemplary embodiment of the present invention are described as H1 and H2 as an example, but the scope of the present invention is not limited to the specific heights of the yoke 200, and the yoke 200 having various heights may be implemented according to a setting of a user. Further, H1 means the entire height of the yoke 200 according to the exemplary embodiment of the present invention, so that a height of the space 210, which is formed by the cutting process, may be H1-H2, and as long as the height H1-H2 of the space 210 is not 0, the height may be included in the scope of the present invention.

Referring to FIG. 2C, a bottom surface 230 of the space 210, which is formed by performing the cutting process on the yoke 200 according to the exemplary embodiment of the present invention, may also have a predetermined inclination. In the above, the height of the raised spot 220 is set to H1-H2, but when the predetermined inclination is formed on the bottom surface 230 of the space 210, which is formed by performing the cutting process on the yoke 200, based on a horizontal surface, the height of the raised spot 220 may be smaller than H1-H2. The space 210 formed in the upper surface of the yoke 200 according to the exemplary embodiment of the present invention may be utilized as the space 210, in which the elastic body 300 may vibrate, which will be described below in detail, so that a height of the space 210 may be increased in an outward direction of the space 210. Herein, the inclination of the bottom surface 230 of the space 210 formed in the upper surface of the yoke 200 may be variously implemented according to a setting of a user. For example, when a vibration width of the elastic body 300 is large, the space 210, which provides a region, in which the elastic body 300 may vibrate, may be large, so that the yoke 200 may be implemented to have a large difference between H1 and H2. In consideration of a loss of a material in the cutting process and the like, the yoke 200 may be cutting processed so that the height of the space 210 is increased in the outward direction of the space 210 formed in the upper surface of the yoke 200.

As illustrated in FIG. 2D, when the yoke 200 according to the exemplary embodiment of the present invention is viewed from the top side, the space 210 formed in the upper surface of the yoke 200 may be divided into a virtual first lateral surface 211 and a virtual second lateral surface 212, and may be opened and exposed to the outside. Further, the space 210 formed in the upper surface of the yoke 200 may be divided into a third lateral surface 213 and a fourth lateral surface 214, and the third lateral surface 213 and the fourth lateral surface 214 may be a part of an internal surface of the yoke 200. In FIG. 2D, it is illustrated that the virtual second lateral surface 212 is exposed to the outside, but in another exemplary embodiment, a surface, which is exposed to the outside, of the space 210 formed in the upper surface of the yoke 200 may be minimized. That is, the virtual second lateral surface is implemented as the internal surface of the space 210 formed in the upper surface of the yoke 200, so that only the virtual first lateral surface 211 may also be exposed to the outside.

Referring back to FIG. 1, the vibration output apparatus 10 according to the embodiment of the present invention may include the elastic body 300 which is in contact with the upper surface of the yoke 200. The elastic body 300 may be in contact with at least a part of the upper surface of the yoke 200. That is, since the space 210, in which the elastic body 300 may vibrate, is formed in the upper surface of the yoke 200 according to the exemplary embodiment of the present invention, a part of the elastic body 300 may be in contact with the upper surface of the yoke 200 except for the portion, in which the space 210 is formed. When the magnetic circuit 100 vibrates according to an alternating current signal applied to the coil 130, the vibration is directly transmitted to the yoke 200 which is in contact with the magnetic circuit 100, and the vibration transmitted to the yoke 200 is transmitted up to the elastic body 300 which is in contact with the upper surface of the yoke 200.

Figure 3:
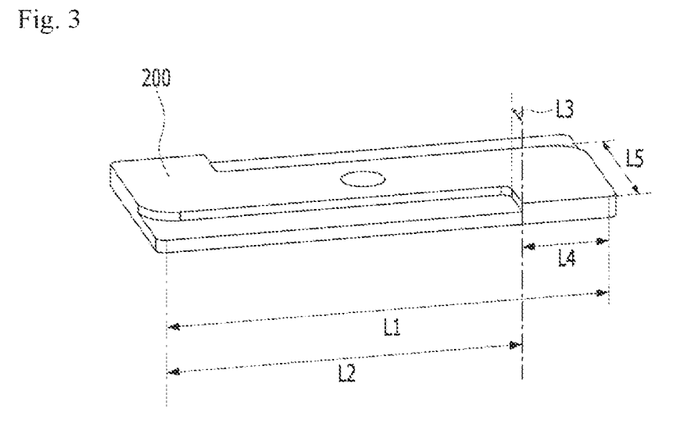
FIG. 3 is a perspective view illustrating a yoke according to an exemplary embodiment of the present invention.

FIG. 3 is a perspective view illustrating a yoke according to an exemplary embodiment of the present invention.

Referring to FIG. 3, a vibration output apparatus 10 according to the exemplary embodiment of the present invention may include a magnetic circuit 100 which generates vibration, a yoke 200 which is in contact with an upper surface of the magnetic circuit 100, and an elastic body 300 which is in contact with at least a part of an upper surface of the yoke 200, and herein, at least one of the lengths of the corners of a space 210 formed in the upper surface of the yoke 200 may be smaller than a length of a corner of a lower surface of the yoke 200 so that the space 210, in which at least a part of the elastic body 300 vertically vibrate, is formed.

For example, when it is assumed that L1 is the length of the corner of the lower surface of the yoke 200, and L2, L3, L4, and L5 are the lengths of the corners of the upper surface of the yoke 200, the space 210, in which the elastic body 300 may vibrate, needs to be formed in the upper surface of the yoke 200, so that the lengths L2, L3, L4, and L5 of the corners of the upper surface of the yoke 200 need to be smaller than the length L1 of the corner of the lower surface of the yoke 200 by the formed space 210. That is, even though the lengths of the corners of the upper surface are L2 and L3, the parts of the corners may be the parts L2 and L3 of the corners of the space 210, in which the elastic body 300 may vibrate, so that the lengths L2, L3, L4, and L5 of the corners of the upper surface of the yoke 200 need to be smaller than the length L1 of the corner of the lower surface of the yoke 200. As illustrated in FIG. 3, the lengths of the corners of the upper surface of the yoke 200 are indicated with L2, L3, L4, and L5, but any one of L2, L3, LA, and L5 cannot be larger than L1.

Further, at least a part of the space 210, in which the elastic body 300 vibrates, may be formed to be exposed to the outside, and a height of the space 210 may be increased in one cross-section of the space 210 formed in the upper surface of the yoke 200 in the outward direction. As described above, when an inclination is given to a bottom surface 230 of the space 210 formed in the upper surface of the yoke 200, a vibration width of the elastic body 300 may be further increased, and an intensive vibration may be transmitted to a user and the like.

In another aspect, a vibration output apparatus 10 according to an exemplary embodiment of the present invention may include a magnetic circuit 100 which generates vibration, an elastic body 300 which vibratorily moves based on the vibration of the magnetic circuit 100, a yoke 200, which is positioned to be in contact between the magnetic circuit 100 and the elastic body 300 and of which a surface area of one of an upper surface and a lower surface is the largest surface area, and a vibration plate 400, which is in contact with the upper surface of the yoke 200, and outputs vibration to the outside according to the vibration of the yoke 200. That is, when a space 210, in which the elastic body 300 may vibrate, is formed in one of the upper surface and the lower surface of the yoke 200, the surface areas of the upper surface and the lower surface of the yoke 200 are inevitably different from each other, and the elastic body 300 may vibratorily move on the surface having a larger surface area between the upper surface and the lower surface of the yoke 200. Further, when the surface area of the upper surface of the yoke 200 is larger than the surface area of the lower surface of the yoke 200, the predetermined space 210 may be formed in the upper surface of the yoke 200. For example, the predetermined space 210 may also be an opened recess, of which at least a part is exposed to the outside. Here, the opened recess exposed to the outside excludes the enclosed space 210, and means an opened recess, of which three internal surfaces (a front surface, a right surface, and a bottom surface) may be viewed when observed from the outside.

Figure 4:
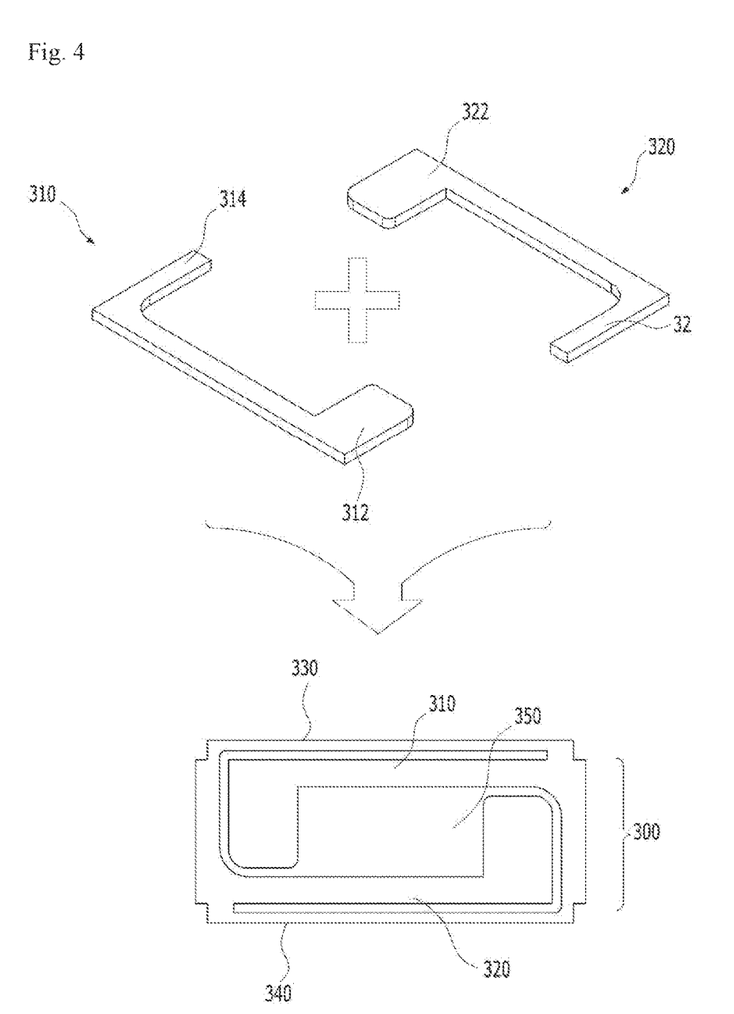
FIG. 4 is a perspective view illustrating an elastic body according to the exemplary embodiment of the present invention.

FIG. 4 is a diagram illustrating the elastic body according to the exemplary embodiment of the present invention.

The elastic body according to the exemplary embodiment of the present invention may include the plurality of elastic units. For example, the elastic body 300 may include a first elastic unit 310 and a second elastic unit 320.

Each of the elastic units may include a vibrating part and a fixed part. For example, the first elastic unit 310 may include a first vibrating part 312 and a first fixed part 314, and the second elastic unit 320 may include a second vibrating part 322 and a second fixed part 324.

The vibrating part 310 of the elastic unit may be in contact with the upper surface of the yoke 200 and vibrate according to vibration of the magnetic circuit 100. A lower surface of the vibrating part of the elastic unit is in contact with the upper surface of the yoke 200 and the lower surface of the yoke 200 is in contact with the upper surface of the magnetic circuit 100, so that the vibration generated by the magnetic circuit 100 may be directly transmitted up to the elastic body 300 through the yoke 200.

For example, when the magnetic circuit 100 moves in the upper direction, the yoke 200, which is in contact with the upper surface of the magnetic circuit 100, and the vibrating part of the elastic unit, which is in contact with the upper surface of the yoke, also move in the upper direction. In this case, the fixed parts 214 and 224 of the elastic units are fixed to a housing 500 and do not move.

The vibrating part of the elastic unit, which has moved in the upper direction, may receive force in a lower direction by elasticity of the elastic unit, and the vibrating part of the elastic unit may move in the lower direction. The magnetic circuit 100 and the yoke 200 may vibratorily move in the vertical direction while the aforementioned process is repeated.

The elastic body 300 may include one or more unit connecting parts for connecting the elastic units 310 and 320. For example, referring to FIG. 4, the elastic body 300 may include two unit connecting parts 330 and 340.

The unit connecting part may be formed of a synthetic resin, a natural resin, or a metal member, and the material of the unit connecting part is not limited thereto.

The unit connecting part may be attached onto one side surface of the elastic unit to connect the plurality of elastic units. For example, the first unit connecting part 330 may be attached onto one side surface of the first elastic unit 310 and one side surface of the second elastic unit 320 to connect the first elastic unit 310 and the second elastic unit 320. Further, the second unit connecting part 340 may also be attached onto one side surface of the first elastic unit 310 and one side surface of the second elastic unit 320 to connect the first elastic unit 310 and the second elastic unit 320.

Further, the first unit connecting part 330 may be attached onto one side surface of the fixed part 314 of the first elastic unit and one side surface of the fixed part 324 of the second elastic unit to connect the first elastic unit 310 and the second elastic unit 320. Further, the second unit connecting part 340 may be attached onto one side surface of the fixed part 314 of the first elastic unit and one side surface of the fixed part 324 of the second elastic unit to connect the first elastic unit 310 and the second elastic unit 320.

The plurality of elastic units and the one or more unit connecting parts, which are included in the elastic body 300 may be integrally molded. For example, the first elastic unit 310, the second elastic unit 320, and the two unit connecting parts 330 and 340 may be integrally molded by an insert injection molding method using a synthetic resin or a natural resin.

Further, the plurality of elastic units 310 and 320 and the plurality of unit connecting parts 330 and 340, which are included in the elastic body 300 may be integrally molded by a casting method using a metal member.

The elastic body 300 may include an opening. For example, the elastic body 300 may include an opening 350, and the elastic body 300 may be integrally molded so that the vibration plate 400 is exposed to the outside through the opening 350. The vibration plate 400 is exposed to the outside, so that the vibration plate 400 may be in direct contact with a body and the like.

The elastic body 300 may be integrally molded to have a structure of being in contact with a part of the upper surface of the yoke 200. For example, each of the vibrating part 312 of the first elastic unit 310 and the vibrating part 322 of the second elastic unit 320, which are included in the elastic body 300 may be in contact with a part of the yoke 200.

Further, the elastic body 300 may be seated on an upper surface of the housing 500. For example, the fixed part 314 of the first elastic unit 310 included in the elastic body 300 is attached onto an upper surface of a right surface 540 or a left surface 530 of the housing, the fixed part 324 of the second elastic unit 320 included in the elastic body 300 is attached onto the upper surface of the left surface 530 or the right surface 540 of the housing, the first unit connecting part 330 included in the elastic body 300 is attached onto an upper surface of a front surface 510 or a rear surface 520 of the housing, and the second unit connecting part 340 included in the elastic body 300 is attached onto the upper surface of the rear surface 520 or the front surface 510 of the housing, so that the elastic body 300 may be seated on the upper surface of the housing 500.

The vibration output apparatus 10 uses the integrally formed elastic body 300, so that the vibration output apparatus 10 may not generate a partial vibration when the elastic body vibrates. Further, the vibration output apparatus 10 uses the integrally formed elastic body 300, so that the vibration output apparatus 10 may increase vibration exciting force and transmit vibration directly to the body and skin.

The foregoing example is simply the exemplary embodiment, and the elastic body 300 is not limited thereto, and the elastic body 300 may be molded by various methods by using a member having elasticity.

Figure 5A:
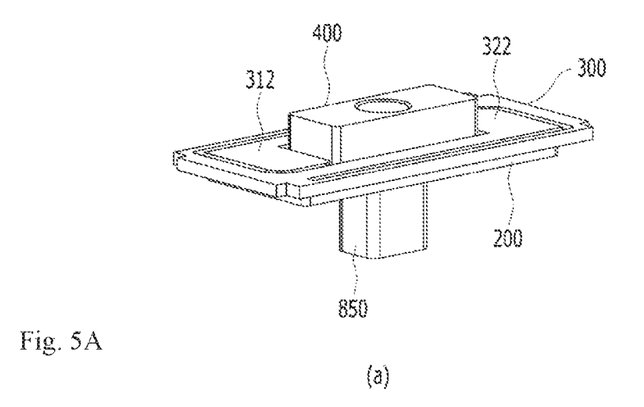
FIGS. 5A and 5B are diagrams illustrating the elastic body which is in contact with the upper surface of the yoke, according to the exemplary embodiment of the present invention.
Figure 5B:
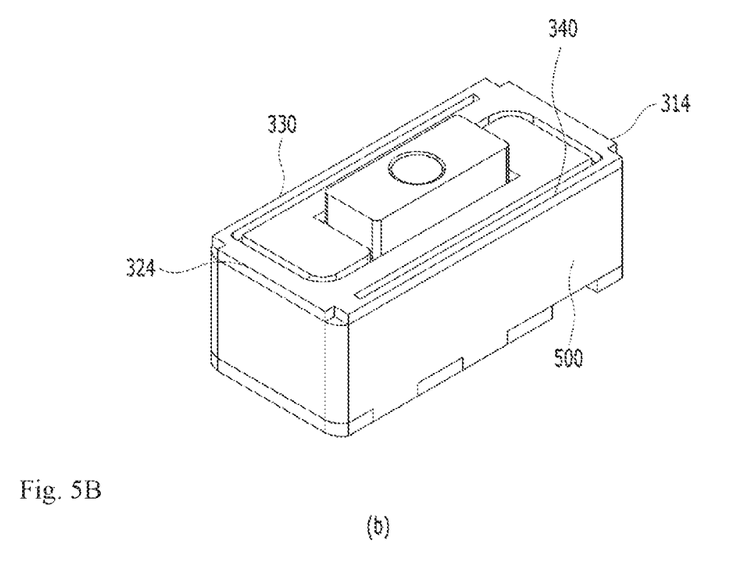

FIGS. 5A and 5B are diagrams illustrating the elastic body which is in contact with the upper surface of the yoke, according to the exemplary embodiment of the present invention.

Referring to FIG. 5A, the elastic body 300 included in the vibration output apparatus 10 according to the exemplary embodiment of the present invention may be in contact with a part of the upper surface of the yoke 200. For example, the elastic body 300 included in the vibration output apparatus 10 may include the first elastic unit 310 and the second elastic unit 320, and each of the vibrating part 312 of the first elastic unit 310 and the vibrating part 322 of the second elastic unit 320 may be in contact with a part of the upper surface of the yoke 200.

The space 210, in which the elastic body 300 may vibrate, is formed in the upper surface of the yoke 200, so that the parts 312 and 322 of the elastic body 300 may be in contact with a part of the upper surface of the yoke 200 except for the portion, in which the space 210 is formed.

According to the exemplary embodiment of the present invention, the vibration plate 400 may be in contact with the upper surface of the yoke. The vibration plate 400 may be in contact with the upper surface of the yoke 200 and pass through the opening 350 of the elastic body 300, which is in contact with the upper surface of the yoke 200, to be exposed to the outside.

Referring to FIG. 5B, the vibration output apparatus 10 may include the housing 500. The upper surface and the lower surface of the housing 500 are opened, and the front surface 510, the rear surface 520, the left surface 530, and the right surface 540 are closed, so that the housing 500 may be molded to have an internal space.

The elastic body 300 may be seated on the upper surface of the housing 500. For example, the fixed part 314 of the first elastic unit 310 included in the elastic body 300 is attached onto the upper surface of the right surface 540 or the left surface 530 of the housing, the fixed part 324 of the second elastic unit 320 included in the elastic body 300 is attached onto the upper surface of the left surface 530 or the right surface 540 of the housing, the first unit connecting part 330 included in the elastic body 300 is attached onto the upper surface of the front surface 510 or the rear surface 520 of the housing, and the second unit connecting part 340 included in the elastic body 300 is attached onto the upper surface of the rear surface 520 or the front surface 510 of the housing, so that the elastic body 300 may be seated on the upper surface of the housing 500.

Figure 6A:
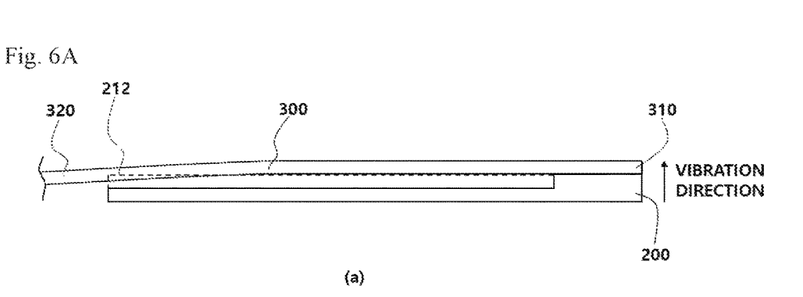
FIGS. 6A and 6B are schematic diagrams illustrating a state where the elastic body vibrates in a predetermined space according to the exemplary embodiment of the present invention.
Figure 6B:
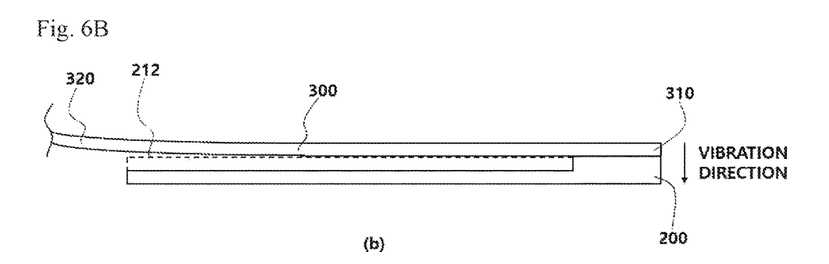

FIGS. 6A and 6B are schematic diagrams illustrating a state where the elastic body vibrates in a predetermined space according to the exemplary embodiment of the present invention.

Referring to FIG. 6A, when the magnetic circuit 100 moves in the upper direction, the yoke 200, which is in contact with the upper surface of the magnetic circuit 100, also moves in the upper direction and the vibrating parts 312 and 322 of the elastic body 300 also move in the same direction. In this case, since the fixed parts 314 and 324 of the elastic body 300 do not move, the elastic body 300 may be bent by elasticity. In order for the elastic body 300 to be bent, it is necessary to provide the space 210, in which the elastic body 300 is bendable, so that the space 210, in which the elastic body 300 may vibratorily move, may be provided in the upper surface of the yoke 200 according to the exemplary embodiment of the present invention.

Referring to FIG. 6B, when the magnetic circuit 100 moves in the lower direction, the yoke 200, which is in contact with the upper surface of the magnetic circuit 100, also moves in the lower direction and the vibrating parts 312 and 322 of the elastic body 300 also move in the same direction. In this case, since the fixed parts 314 and 324 of the elastic body 300 do not move, the elastic body 300 may be bent by elasticity. Unlike FIG. 6A, the space 210, in which the elastic body 300 is bent, is not required.

FIGS. 6A and 6B schematically illustrate the degree of bending of the elastic body 300, but the scope of the present invention is not limited to a specific elastic modulus of the elastic body 300 or a specific angle, in which the elastic body 300 is bent. However, in order to increase intensity of the vibration, it is necessary to increase widths of the vibrations of the yoke 200 and the elastic body 300 and secure the large space 210, in which the elastic body 300 vibrates, so that the space 210 having various volumes may be provided in the upper surface of the yoke 200 according to performance of the vibration output apparatus 10.

In order for the elastic body 300 according to the exemplary embodiment of the present invention to vibratorily move in the vertical direction, it is necessary to provide a fixed reference point so that the vibrating parts 312 and 322 of the elastic body 300 may vibrate. Accordingly, the elastic body 300 according to the exemplary embodiment of the present invention may include the fixed parts 314 and 324. The fixed parts 314 and 324 of the elastic body 300 may be coupled to a portion which does not vibrate.

Figure 7:
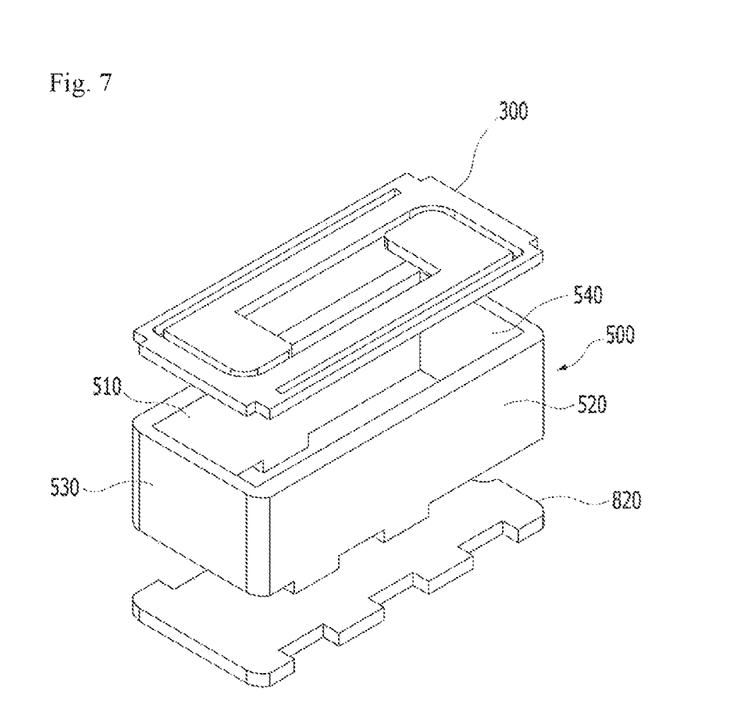
FIG. 7 is a diagram for describing a housing according to an exemplary embodiment of the present invention.

FIG. 7 is a diagram for describing the housing 500 according to the exemplary embodiment of the present invention.

Referring to FIG. 7, the housing 500 according to the exemplary embodiment of the present invention has the structure, in which the upper surface and the lower surface are opened, and the left surface 530, the right surface 540, the front surface 510, and the rear surface 520 are closed, thereby being molded so as to have an internal space.

The elastic body 300 may be seated on the upper surface of the housing 500. For example, the fixed part 314 of the first elastic unit 310 included in the elastic body 300 is attached onto the upper surface of the right surface 540 or the left surface 530 of the housing, the fixed part 324 of the second elastic unit 320 included in the elastic body 300 is attached onto the upper surface of the left surface 530 or the right surface 540 of the housing, the first unit connecting part 330 included in the elastic body 300 is attached onto the upper surface of the front surface 510 or the rear surface 520 of the housing, and the second unit connecting part 340 included in the elastic body 300 is attached onto the upper surface of the front surface 510 or the rear surface 520 of the housing, so that the elastic body 300 may be seated on the upper surface of the housing 500.

In this case, the fixed part 314 of the first elastic unit 310 may be attached onto the housing 500 in a direction facing the fixed part 324 of the first elastic unit 310, and the first unit connecting part 330 may be attached onto the housing 500 in a direction facing the second unit connecting part 340.

The housing 500 may provide a reference point so that the elastic body 300 may vibratorily move. In the exemplary embodiment, the fixed parts 314 and 324 of the elastic body 300 may be attached onto the upper surface of the left surface 530 or the right surface 540 of the housing 500, and the vibrating parts 312 and 322 of the elastic body 300 may be provided so as to be in contact with a part of the upper surface of the yoke 200. The vibrating parts 312 and 322 of the elastic body 300 may vibratorily move in the vertical direction based on the fixed parts 314 and 324 of the elastic body 300 by the vibration motion of the yoke 200.

The lower surface of the housing 500 may be opened. Further, each of the left surface 530, the right surface 540, the front surface 510, and the rear surface 520 of the housing 500, or a lower surface of a combination thereof may include a bent portion. For example, each of the left surface 530, the right surface 540, the front surface 510, and the rear surface 520 of the housing 500 may include the bent portion, and the housing 500 may couple the bent portion and a bent portion included in a cap 820, so that the lower surface of the housing 500 may be seated on the cap.

Figure 8:
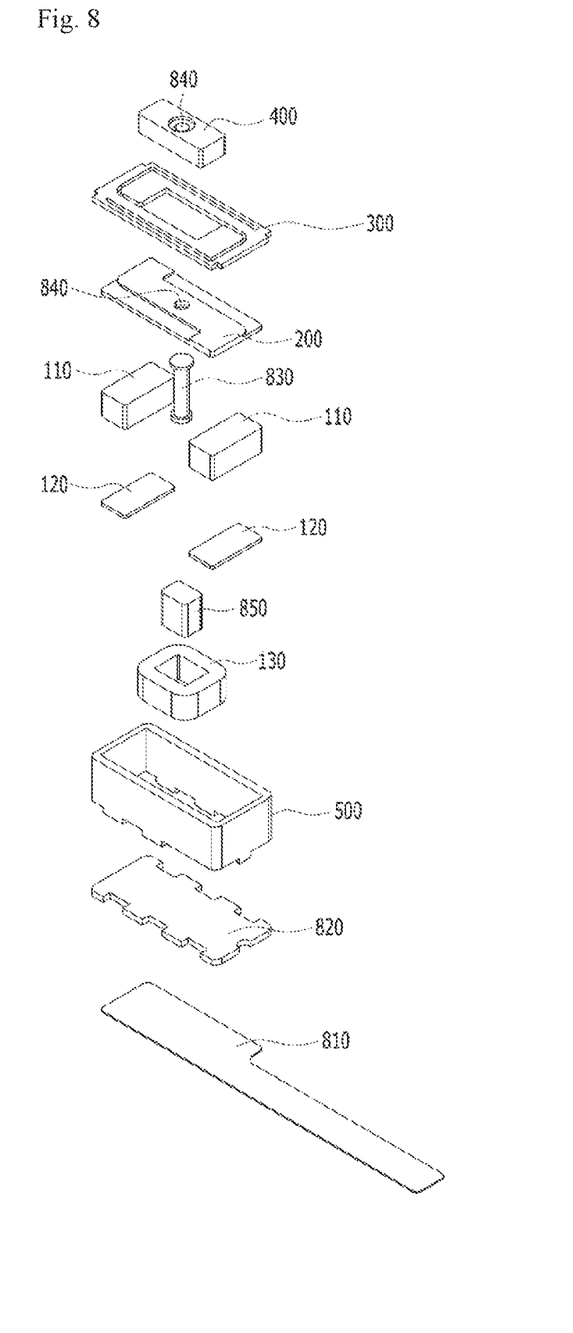
FIG. 8 is an exploded view illustrating a vibration output apparatus according to an exemplary embodiment of the present invention.

FIG. 8 is an exploded view illustrating the vibration output apparatus according to an exemplary embodiment of the present invention.

Referring to FIG. 8, the vibration output apparatus 10 according to the exemplary embodiment of the present invention may include a printed circuit board (PCB) substrate 810. The PCB substrate 810 may be a means which is capable of supporting the vibration output apparatus 10. The cap 820 may be provided on an upper surface of the PCB substrate 810. The cap 820 may connect the housing 500 and the PCB substrate 810 to fix the housing 500 and the PCB substrate 810. As described above, the upper surface and the lower surface of the housing 500 are opened, and the front surface 510, the rear surface 520, the left surface 530, and the right surface 540 are closed, so that the housing 500 may have an internal space. The coil 130 may be provided in the internal space of the housing 500. The coil 130 may provide a change in a magnetic field according to an alternating current signal applied from the outside. The magnetic circuit 100 may be provided at a predetermined interval with the coil 130 without being in contact with the coil 130. The top plate 120, which is capable of concentrating magnetic force of the magnetic circuit 100, may be provided on the lower surface of the magnetic circuit 100. The yoke 200 may be provided in the upper surface of the magnetic circuit 100, and the vibration of the magnetic circuit 100 may be transmitted to the yoke 200. A part of the upper surface of the yoke 200 may be in contact with the vibrating parts of the elastic body 300, and the fixed parts 314 and 324 of the elastic body 300 may be in contact with the left surface 530, or the right surface 540 of the housing 500, or a combination thereof. The vibration plate 400 may be provided in the upper surface of the yoke 200 to transmit the vibration of the magnetic circuit 100 to the user and the like. Further, a through hole 840, to which a rivet 830 may be connected, may be formed at centers of the yoke 200 and the vibration plate 400. The aforementioned respective constituent elements may be coupled by the rivet 830 and a yoke pole 850 to form one vibration output apparatus 10.

An exemplary embodiment according to the present invention may provide a portable electronic device including a vibration output apparatus 10, which includes a magnetic circuit 100 generating vibration, a yoke 200, which is in contact with the upper surface of the magnetic circuit 100, is formed with a raised spot 220 with different heights in at least one of lateral surfaces in a height direction, and is formed with one or more spaces 210 on an upper surface, and an elastic body 300, which is in contact with at least a part of an upper surface of the yoke 200, and vibratorily moves in the one or more spaces 210. Herein, the portable electronic device may include an electronic device and the like, which require a transmission of a voice signal or a vibration signal. For example, the portable electronic device may be any one of the various electronic devices, such as a portable terminal, a mobile terminal, a telematics terminal, a notebook computer, a digital broadcasting terminal, a personal digital assistant (PDA), a Wibro terminal, an internet television (IPTV), an audio video navigation (AVN) terminal, a portable multimedia player, and a navigation terminal (a vehicle navigation device (navigation terminal)). Further, the portable electronic device may include the Google glasses by Google Inc.

Figure 9A:
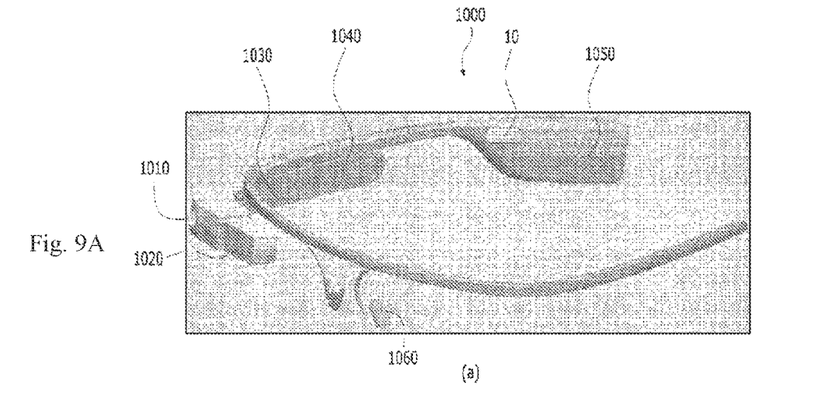
FIGS. 9A, 9B, and 10 are schematic diagrams illustrating a state where the vibration output apparatus according to the exemplary embodiment of the present invention is mounted in a portable electronic device.
Figure 9B:
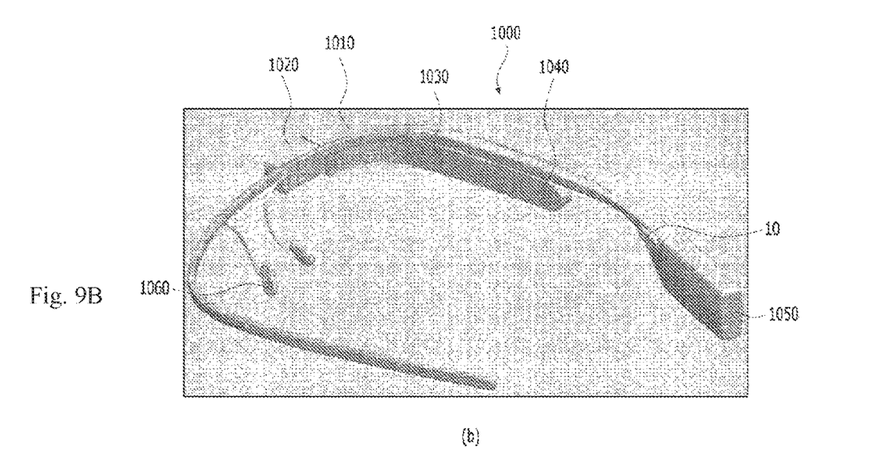
Figure 10:
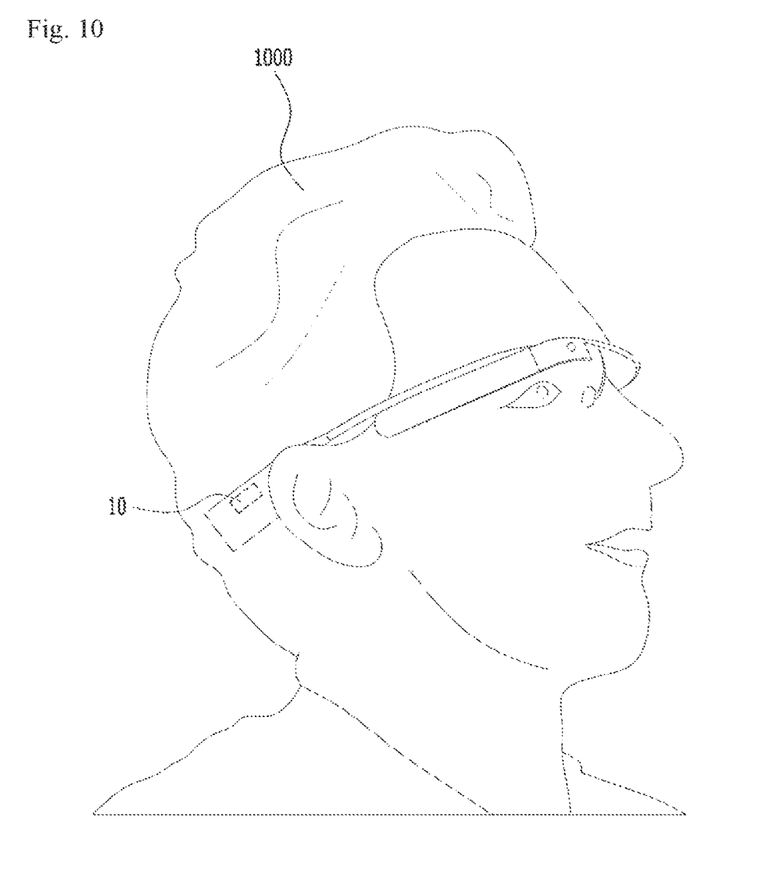

FIGS. 9A, 9B, and 10 are schematic diagrams illustrating a state where the vibration output apparatus according to the exemplary embodiment of the present invention is mounted in a portable electronic device.

Referring to FIGS. 9A and 9B, the vibration output apparatus 10 according to the exemplary embodiment of the present invention may be mounted into a portable electronic device 1000. Herein, the portable electronic device 1000 may include the Google glasses by Google Inc. The Google glasses 1000 may include a camera 1010, which is capable of photographing an external image, and a visual overlay 1020, which is capable of providing a user and the like with an image. Further, the Google glasses 1000 may include a communication module 1030, which is capable of exchanging data with an external communication network, and a calculation processing device 1040, such as a CPU, which is capable of calculating received data. Further, the Google glasses 1000 may include a chargeable battery unit 1050, which is capable of supplying energy, and a support means 1060, which assist the user and the like to wear the Google glasses 1000 like glasses. Further, the Google glasses 1000 according to the exemplary embodiment of the present invention may include a vibration output apparatus 10 including a magnetic circuit 100, a yoke 200, and an elastic body 300. For example, the vibration output apparatus 10 may be installed in a portion, in which the Google glasses 1000 is in contact with a bone conduction region of the user and the like.

As illustrated in FIG. 10, the user and the like may wear the Google glasses 1000 and receive a voice signal and a sound signal, such as music, as a vibration signal through the vibration output apparatus 10 provided in the Google glasses 1000.

The present invention has been described with reference to the exemplary embodiments, but those skilled in the art may understand that the present invention may be variously modified and changed within the scope without departing from the spirit and the area of the present invention described in the accompanying claims.

MODE FOR CARRYING OUT THE INVENTION

From the foregoing, relevant contents have been described in the best mode for carrying out the invention.

INDUSTRIAL APPLICABILITY

The present invention may be used in various electronic devices using a bone conduction technology.

The invention claimed is:

1. An apparatus for outputting vibration, the apparatus comprising:
   a magnetic circuit having an upper surface, the magnetic circuit generating vibration;
   a yoke having an upper surface, the yoke being in contact with the upper surface of the magnetic circuit and having raised spots with different heights, the raised spots being in a height direction in at least one lateral surface of the yoke such that one or more spaces are formed in the upper surface of the yoke; and
   an elastic body being in contact with at least a part of the upper surface of the yoke and vibratorily moving in the one or more spaces of the yoke,
   wherein the elastic body includes a first elastic unit and a second elastic unit, the first elastic unit and the second elastic unit being integrally molded,
   wherein each of the first elastic unit and the second elastic unit is bent in the one or more spaces of the yoke to move vibratorily corresponding to the movement of the magnetic circuit.

2. The apparatus of claim 1, further comprising:
   a housing having an upper surface and a lower surface that are opened, and a front surface, a rear surface, a left surface, and a right surface that are closed, to create an internal space; and
   a coil being positioned inside the housing and receiving an alternating current signal provided from the outside,
   wherein the magnetic circuit vibrates according to a change in a magnetic field provided by the coil.

3. The apparatus of claim 2, wherein each of the first elastic unit and the second elastic unit includes:
   a vibrating mechanism that is in contact with the at least a part of the upper surface of the yoke; and
   a fixed region being attached to an upper surface of at least one of the front surface, the rear surface, the left surface, and the right surface of the housing, and providing a reference point so that the vibrating mechanism vibrates.

4. The apparatus of claim 2, wherein each of the first elastic unit and the second elastic unit is attached to an upper surface of the left surface or the right surface of the housing so that the elastic body is seated on the upper surface of the housing,
   wherein the coil and the magnetic circuit is positioned in the internal space of the housing;
   wherein the apparatus further comprises a cap that is positioned in the lower surface of the housing.

5. The apparatus of claim 1, wherein at least a part of the one or more spaces of the yoke, which is formed by contact of the yoke and the elastic body, is exposed to the outside.

6. The apparatus of claim 1, further comprising:
a vibration plate being in contact with the upper surface of the yoke,
wherein the vibration plate outputs the vibration to the outside of the yoke.

7. The apparatus of claim 1, wherein the vibration is in the vertical direction.

8. The apparatus of claim 1, wherein the elastic body further includes one or more unit connecting parts that connect the first elastic unit and the second elastic unit, and the one or more unit connecting parts, the first elastic unit, and the second elastic unit being integrally molded.

9. The apparatus of claim 1, wherein the elastic body further includes a first unit connecting part and a second unit connecting part,
- the first unit connecting part being attached to a first surface of a fixed part of the first elastic unit and a first surface of a fixed part of the second elastic unit to connect the first elastic unit and the second elastic unit,
- the second unit connecting part being attached to a second surface of the fixed part of the first elastic unit and a second surface of the fixed part of the second elastic unit in a direction facing the first unit connecting part to connect the first elastic unit and the second elastic unit, and
- the first elastic unit, the second elastic unit, the first unit connecting part, and the second unit connecting part being integrally molded.

10. An apparatus for outputting vibration, the apparatus comprising:
  a magnetic circuit having an upper surface, the magnetic circuit generating vibration;
  a yoke having an upper surface and a lower surface, the yoke being in contact with the upper surface of the magnetic circuit; and
  an elastic body being in contact with at least a part of the upper surface of the yoke,
  wherein at least one of lengths of the upper surface of the yoke is smaller than a length of a corner of the lower surface of the yoke so that a space, in which at least a part of the elastic body vertically vibrates, is formed, and
  the elastic body is formed of a first elastic unit and a second elastic unit, the first elastic unit and the second elastic unit being integrally molded,
  wherein each of the first elastic unit and the second elastic unit is bent in one or more spaces of the yoke to move vibratorily corresponding to the movement of the magnetic circuit.

11. An apparatus for outputting vibration, the apparatus comprising:
  a magnetic circuit having an upper surface, the magnetic circuit generating vibration;
  an elastic body that vibratorily moves based on the vibration of the magnetic circuit;
  yoke having an upper surface and a lower surface, the yoke being positioned between the magnetic circuit and the elastic body, a surface area of one of the upper surface and the lower surface of the yoke being larger than the other; and
  a vibration plate being in contact with the upper surface of the yoke and outputting the vibration to the outside of the yoke,
  wherein the elastic body is formed of a first elastic unit and a second elastic unit, the first elastic unit and the second elastic unit being integrally molded,
  wherein each of the first elastic unit and the second elastic unit is bent in one or more spaces of the yoke to move vibratorily corresponding to the movement of the magnetic circuit.

* * * * *